United States Patent [19]
Schmidt et al.

[11] Patent Number: 6,012,299
[45] Date of Patent: Jan. 11, 2000

[54] PROCESS FOR THE CONTROL OF A REFRIGERATION SYSTEM, AS WELL AS A REFRIGERATION SYSTEM AND EXPANSION VALVE

[75] Inventors: Frede Schmidt; Kenn Sønder Jensen, both of Sønderborg, Denmark

[73] Assignee: Danfoss A/S, Nordborg, Denmark

[21] Appl. No.: 09/286,011

[22] Filed: Apr. 5, 1999

Related U.S. Application Data

[62] Division of application No. 08/971,284, Nov. 17, 1997, Pat. No. 5,921,098.

[30] Foreign Application Priority Data

Nov. 18, 1996 [DE] Germany ............ 40 05 728 A1

[51] Int. Cl.[7] .......................................... G05D 23/30
[52] U.S. Cl. ................................ 62/202; 236/68 R
[58] Field of Search ..................... 62/225, 202, 224; 236/68 R, 92 B

[56] References Cited

U.S. PATENT DOCUMENTS

| | | | |
|---|---|---|---|
| 4,879,879 | 11/1989 | Marsala et al. | 62/225 |
| 5,148,978 | 9/1992 | Stapelbroek | 62/225 |
| 5,515,695 | 5/1996 | Sakakibara et al. | 236/92 B |
| 5,941,086 | 8/1999 | Petrulio et al. | 236/68 R |

*Primary Examiner*—William E. Tapolcai
*Attorney, Agent, or Firm*—Lee, Mann, Smith, McWilliams, Sweeney & Ohlson

[57] ABSTRACT

A process for controlling a refrigeration system, as well as the refrigeration system and a new expansion valve for the refrigeration system. An electronic regulator is used to operate a sensor system having a device for applying heat power to the sensor system in direct dependence on sensed superheat of the refrigerant leaving the evaporator. By locating the sensing system in communication with liquid refrigerant upstream of the evaporator, heat transfer to the liquid refrigerant is utilized for operation of the sensor system rather than heat transfer to the superheat, resulting in a far more stable and efficient refrigeration control.

7 Claims, 5 Drawing Sheets

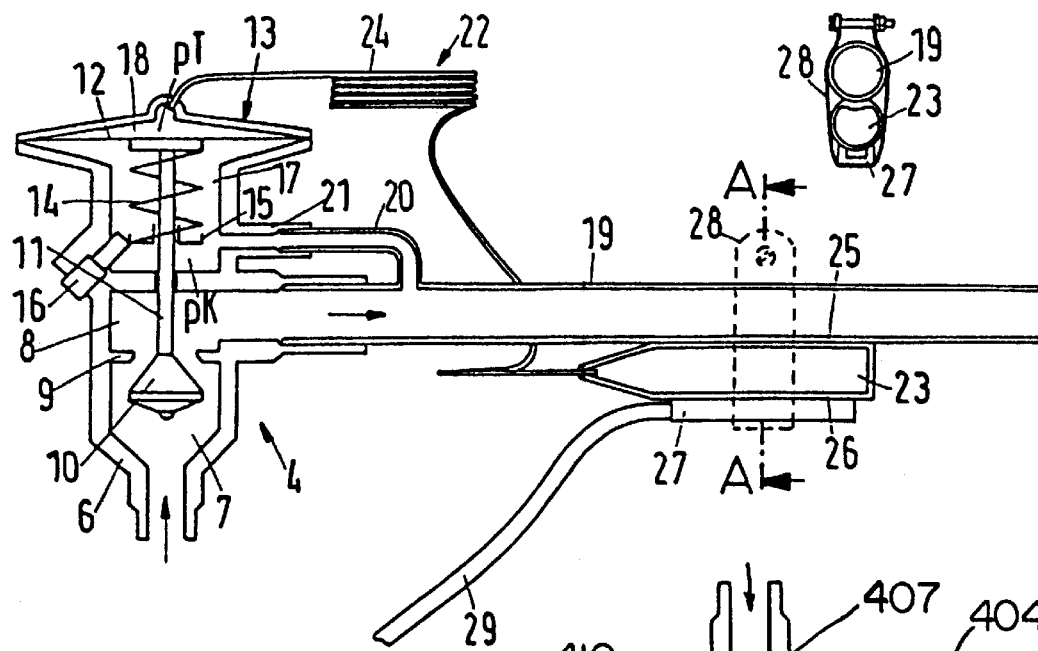
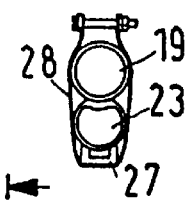
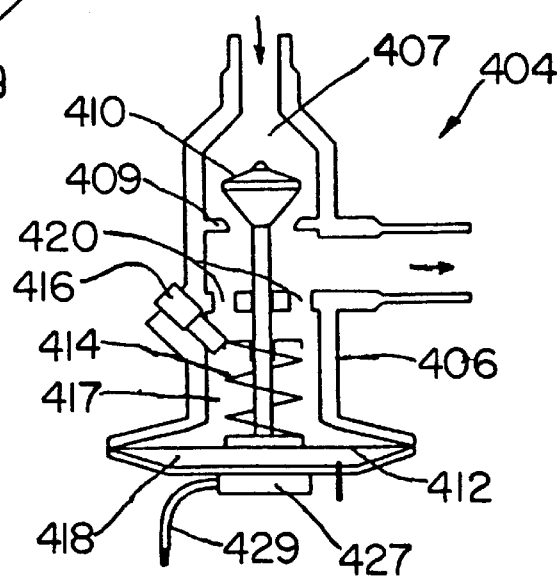
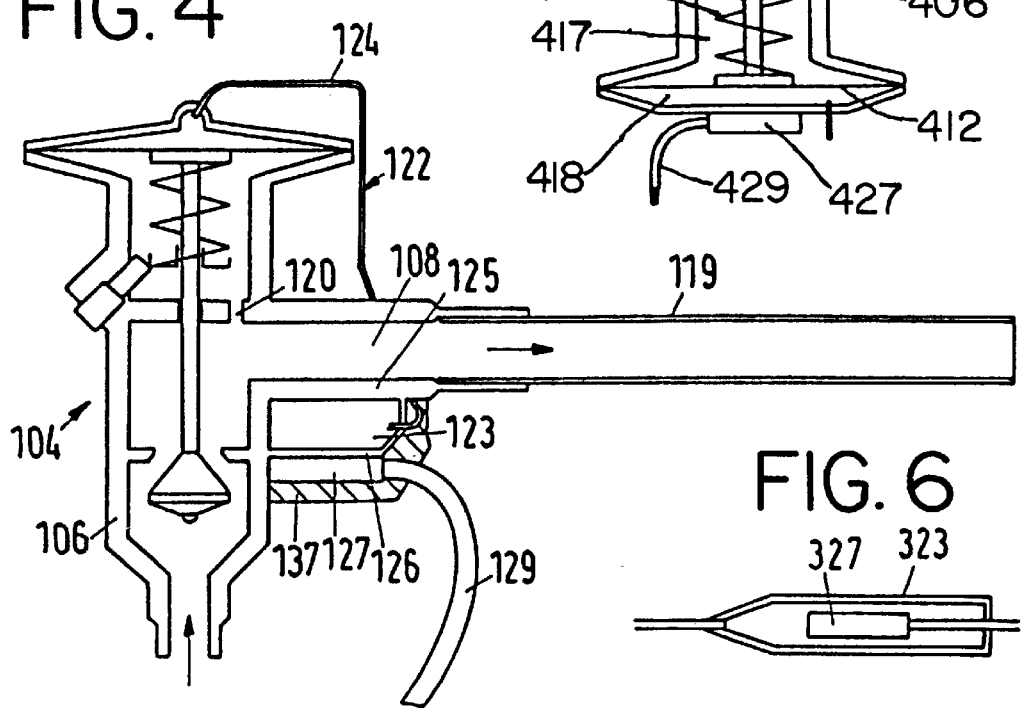
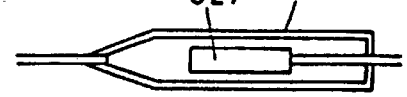

PROCESS FOR THE CONTROL OF A REFRIGERATION SYSTEM, AS WELL AS A REFRIGERATION SYSTEM AND EXPANSION VALVE

RELATED APPLICATION

This application is a division of U.S. patent application Ser. No. 08/971,784, filed Nov. 17, 1997, now U.S. Pat. No. 5,921,098.

BACKGROUND OF THE INVENTION

The invention involves a process for the control of a refrigeration system, a refrigeration system, and an expansion valve for a refrigeration system of this type.

Published German Application No. DE 40 05 728 A1 is an example of the prior art. In it, the refrigeration system is controlled as a function of superheating at the evaporator outlet. For this purpose, the expansion valve has an actuator constructed as a diaphragm which is contacted on one side by refrigerant pressure at the evaporator outlet and on the other side by a pressure corresponding to the refrigerant temperature at the evaporator outlet. This control requires that either the suction line leading to the compressor or a measuring section constructed as a capillary tube, for example, be connected to the expansion valve. This leads in many ways to restrictions in the design of the refrigeration system. In addition, a control which is not very smooth, having a greatly fluctuating superheating, frequently results.

In the known case, an additional influence, which is derived from the temperature in the line between the compressor and condenser, is superimposed on this superheating control. For this purpose, one of the two pressure cavities of the syphon diaphragm is filled with a control medium which has a heat exchange through the diaphragm with the superheated refrigerant at the outlet of the evaporator and is additionally heated by the heating element, for example a PTC-resistor.

U.S. Pat. No. 4,467,613 is another example of the prior art. This reference has a sensor located downstream of an evaporator, therefore in communication with the superheat. it also results in a control which is not smooth, and can have widely fluctuating superheating.

SUMMARY OF THE INVENTION

The purpose of the invention is to improve the control of a refrigeration system using simple and cost-effective methods. In accordance with the invention, an expansion valve is provided, comprising a closure member coupled to a displaceable wall separating a pressure chamber from a sensor chamber, with the sensor chamber comprising at least part of a sensor system holding a charge for generating a temperature-dependent pressure. The closure member is formed to open a passage between an inlet and outlet of the expansion valve upon displacement of the wall into the pressure chamber. A heater is provided in thermal contact with the sensor system, and a heat transfer path is formed from the sensor system to a surface in fluid communication with expanded liquid refrigerant located downstream of the passage.

In accordance with one form of the invention, the surface for heat transfer from the sensor system to the liquid expanded refrigerant comprises a portion of the outlet of the expansion valve. In this form of the invention, the sensor system includes a sensor located at an outlet of the expansion valve, with the heater being in thermal contact with the sensor. In another form of the invention, the surface comprises at least a portion of the displaceable wall in the valve. In this form of the invention, the sensor chamber comprises the sensor system, and the heater is mounted on the sensor chamber.

In several forms of the invention, the superheat of the evaporated refrigerant leaving the evaporator is sensed, and a regulator, coupled to the superheat sensing means and to the heater, is employed for controlling the heat power supplied to the sensor system in dependence on the superheat. A very simply yet effective control arrangement is therefore provided.

The degree of the valve opening is essentially determined by the supply of heat using the heater. This is because the vapor pressure in the sensing system is increased by heating. The larger the quantity of heat supplied to the heater, the larger the degree of the valve opening. Due to the following relation, practical proportionality is given:

$$E = K \times A \times (T_f - T_s)$$

E=the heat supplied to the heater
K=heat transfer coefficient
A=heat transfer surface between sensor and refrigerant
$T_f$=sensor temperature
$T_s$=saturation temperature of the refrigerant at the valve outlet This relation applies independently of exactly how high the saturation pressure and saturation temperature of the refrigerant are at the valve outlet. The degree of valve opening is thus independent of the pressure of the immediately downstream evaporator, because the evaporator pressure is not used in controlling the valve opening.

Since the supply of heat is controlled by a regulator, all possible regulating methods can be applied to improve the control—for example, using a PI-controller. Furthermore, additional supplemental functions can be taken into account, such as a dependence on compressor rotational speed, and freezing up or overheating of the condensed refrigerant. This allows a very exact control. A further advantage is that the expansion valve closes if the heating element fails.

A sensor line connection between the outlet of the evaporator and the expansion valve is not necessary. For the connection between the measurement positions and the regulator, simple signal lines are sufficient, and for the connection between the regulator and the heating element, a simple electrical line is sufficient. This leads to a simple and inexpensive construction. When adapting the refrigeration system to a certain application purpose, the conductor path can be selected with a larger amount of freedom than heretofore possible. The control principle is suitable not only for dry evaporators in which the superheating is measured, but also for submerged or flooded evaporators, for which the level of liquid in the evaporator is measured. All of this allows a very versatile application.

The expression "outlet of the expansion valve" includes all locations between the expansion passage of the expansion valve and the actual input of the evaporator, even if other elements such as reversing valves, distributors, or other installed components are present. Thus, there is great flexibility in the nature of and location of the sensor.

It is preferred that the structural components be located close the expansion valve, because operations can then be performed using short connection paths. If the compensation channel runs adjacent the valve, only a short tube is needed to connect the refrigerant line to the pressure chamber. An even more inexpensive solution results if the compensation channel is located inside the valve. However, the capillary tube extending between the sensor and the sensor chamber leads to a clear separation of the sensor temperature and the temperature in the pressure chamber.

For a further form of the invention, the heating element is arranged inside the sensor. This results in an even better heat transfer and makes mounting easier.

In all forms, the heating element is located beneath the sensor or fluid in the sensor to permit proper thermal transfer between the heating element and the charge in the sensor.

In practice it is preferable if the valve housing, the compensation channel, and the sensor system form a pre-assembled structural unit. The portion of the refrigerant line connected to the valve outlet can also form part of the structural unit.

BRIEF DESCRIPTION OF THE DRAWINGS

The invention is described more precisely in the following description using the preferred embodiment examples depicted in the drawing figures, in which:

FIG. 2 is a schematic representation of an expansion valve according to the invention, partially in cross section, FIG. 3 is a cross section taken along lines A—A of FIG. 2, FIG. 4 is a schematic representation of a modified expansion valve, partially in cross section, FIG. 6 is a modified sensor, FIG. 7 is a schematic representation of a further modified expansion valve according to the invention, partially in cross section.

DESCRIPTION OF EXAMPLES EMBODYING THE BEST MODE OF THE INVENTION

Figure 1:
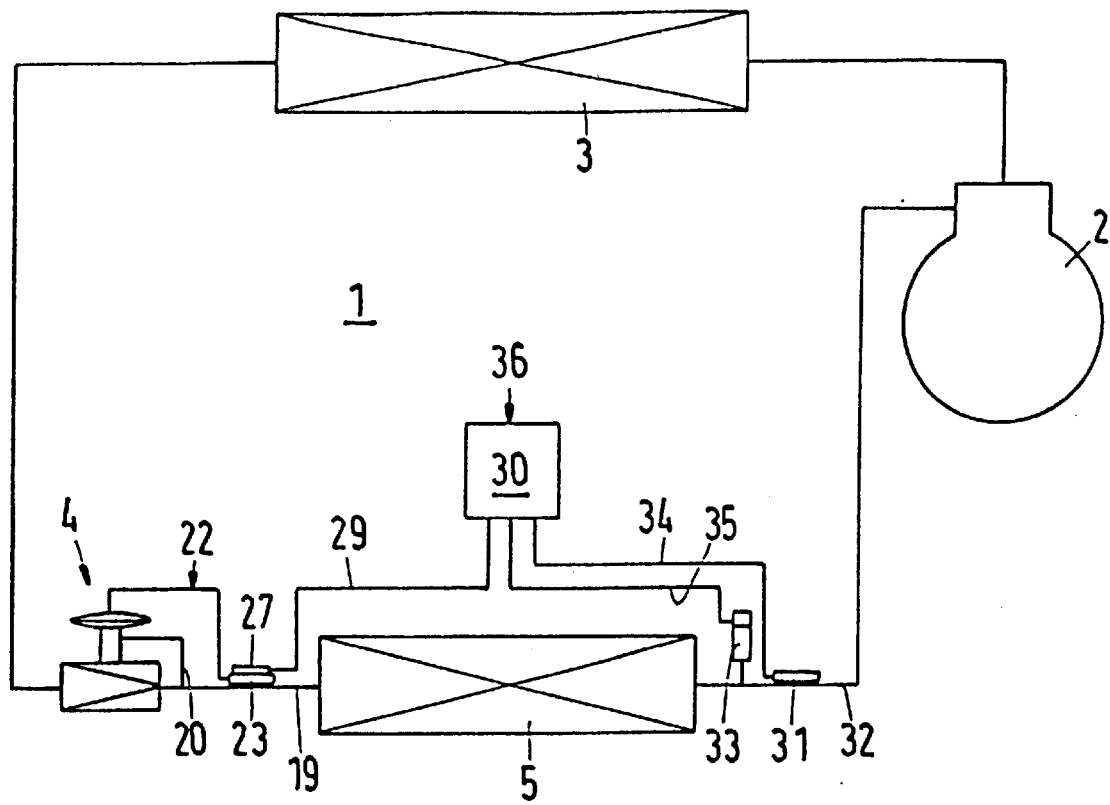
FIG. 1 is a schematic diagram of a refrigeration system according to the invention having a traverse evaporator.

FIG. 1 shows a refrigeration system 1 in which a compressor 2 for the refrigerant, a condenser 3, an expansion valve 4, and a dry evaporator 5 are arranged in series. By a dry evaporator, an evaporator in which the entire refrigerant is evaporated during a single run-through of the evaporator is understood.

The expansion valve 4 can have the form shown in FIG. 2. A valve housing 6 has an input chamber 7 and an output chamber 8, between which a valve seat 9 is located. A stopper 10 is supported by a valve rod 11 which acts together with a displaceable actuator 12 in a diaphragm syphon 13. The stopper 10 is under the influence of a spring 14 whose spring plate 15 can be adjusted using an adjusting device 16, and furthermore, under the influence of the pressure pK in a lower pressure chamber 17 and, in the opposite direction, under the influence of the pressure pT in an upper pressure chamber 18. A refrigerant line 19 in the form of a copper tube is connected to the output chamber 8. The line 19 is connected via a compensation channel 20, constructed in the form of a pipe, to a connection piece 21 which leads to the lower pressure chamber 17. The pressure pK thus corresponds to the refrigerant pressure at the outlet of the expansion valve 4.

The upper pressure chamber 18 is part of a sensor system 22 having a sensor 23 which is connected via a capillary tube 24 to the upper pressure chamber 18. The sensor 23 adjoins the refrigerant line 19 along a first wall section 25. A second wall section 26 on the opposite side adjoins an electrically heated heating element 27. The sensor 23 and heating element 27 are located beneath the line 19 for proper thermal transfer between the heating element 27 and fluid in the sensor 23. A tension device 28, such as a band or clamp, is used to attach the sensor 23 and the heating element 27 to the refrigerant line 19. Current to the heating element 27 is supplied via an electrical line 29. The sensor system 22 contains a charge comprising a liquid-vapor filling which means that the pressure pT in the pressure chamber 18 is equal to the saturation pressure of the filling medium at the respective sensor temperature. Other charges may be used, such as an absorption charge where a medium is reversibly absorbed in a matrix, such as a molecular sieve or a zeolith, or a sublimation charge which undergoes a direct solid-to-gas phase change in response to temperature changes, or even a simple gas charge. Other means of sensing can also be used, as will be apparent to one skilled in the art.

As FIG. 1 shows further, only a single connection element, namely the electrical line 29, must be placed in the area of the expansion valve 4 in order to activate the valve. The heat output to be emitted by the heating element 27 is controlled by a regulator 30 to which the momentary superheating, i.e. the difference between the actual refrigerant temperature and the saturation temperature, is supplied as an actual value. For this purpose, the refrigerant temperature is measured in a conventional manner using a temperature sensor 31, which fits on the output line 32 of the evaporator. The refrigerant pressure, which is equivalent to the saturation temperature, is also measured in a conventional manner using a pressure sensor 33 which is connected to sense the pressure of the output line 32. The measurement values are conducted over respective signal lines 34 and 35 to the regulator 30. The sensors 31 and 33 can be electronic sensors which transmit electric signals over the signal lines. Through an additional input 36 it is indicated that even more influences, other than superheating, can be utilized by the regulator 30, as well.

The filling medium in the sensor system is selected with respect to the refrigerant such that when there is no heating, the sensor pressure pT above the actuator is somewhat higher than the refrigerant pressure pK below the actuator. The pressure ratios are determined, however, in a manner such that due to the spring 14, the force acting from below is somewhat larger than the force acting from above. Thus, the expansion valve is closed when there is no heating. A slight supply of heat to the sensor 23 is sufficient, however, to open the valve. Moreover, care is taken in selecting the charge and the spring so that the summation curve of the spring force and the refrigerant pressure pK has an approximately constant distance from the curve of the sensor pressure pT in the control range, as described in greater detail below. Using the spring 14, a superheating, e.g. 4° C., is set. As soon as this is exceeded, the expansion valve opens.

In operation, in the regulator 30, preferably a PI-regulator, a reference value is set and compared to the measurement value of the superheating. The heat output is controlled as a function of the deviation of the measurement value from the reference value so that a continuous operation results, having a few fluctuations. In this process, the degree of the valve opening is proportional to the supplied heat output and occurs independently of the level of the evaporator pressure in the refrigerant line 19.

From FIG. 2 it can further be seen that the expansion valve itself can be a standard valve, in which the connections to the two pressure chambers 17 and 18 are provided in a new way. Because all connections can be made close behind the expansion valve, valve housing 6, compensation channel 20, sensor system 22 and refrigerant line 19 also can be delivered as a pre-assembled structural unit.

The electrical line 29 and the signal lines 34 and 35 can be positioned without difficulty in the device which supports the refrigeration system, which contributes to a further expense reduction.

In FIG. 4, reference numerals which have been increased by 100 are used for corresponding parts. One item which is different is that the compensation channel 120 is provided internally as a passage in the housing 106. Furthermore, a hollow chamber in the valve housing 106 functions as a sensor 123 which connects to a wall section 125 on the outlet-side chamber 108 of the valve housing 106, and has a wall section 126 on the other side adjoined by the heating element 127. Sensor 123 and heating element 127 are covered by a heating insulation 137 to prevent radiation losses to the outside.

In this form a new type of valve is provided which has all essential characteristics in and on its housing. It can be preassembled with or without the refrigerant line 119 as a structural unit.

Figure 5:
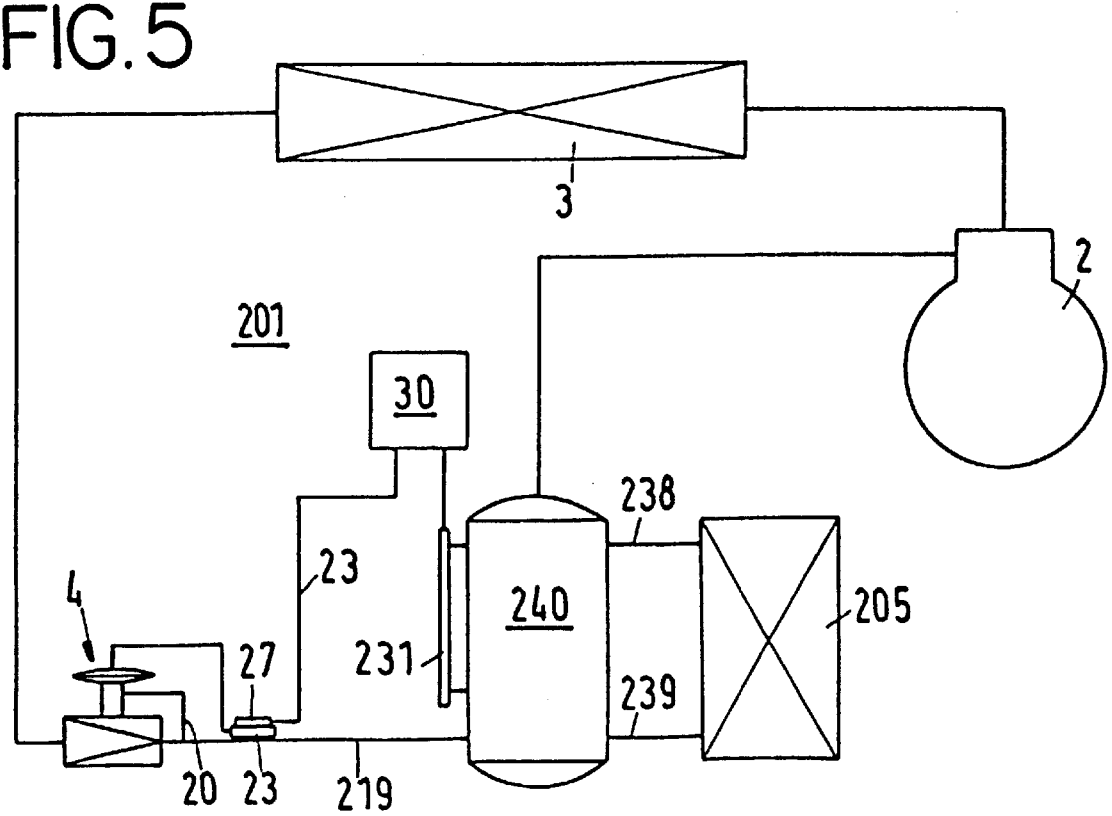
FIG. 5 is a schematic diagram of a modified refrigeration system according to the invention, having a flooded evaporator.

In the refrigeration system 201 in FIG. 5, the same reference numerals as in FIG. 1 are used for identical parts, and for the modified parts, reference numerals which have been increased by 200 are used. Here, a flooded evaporator 205 which is connected to a collection chamber 240 via an upper line 238 and a lower line 239 is used. The refrigerant flows as a mixture of liquid and vapor over the upper line 238 back into the collection chamber 240, while via the lower line 239, liquid refrigerant follows flowing into the evaporator 205. This circulation occurs automatically; however, it can also be supported by a pump (not illustrated). A level indicator 231 reports the liquid level to the regulator 30, which adjusts the degree of opening of the expansion valve 4 such that a desired liquid level is maintained.

For the sensor 323 represented in FIG. 6, the heating element 327 is arranged in an inner cavity of the sensor. A sensor of this type can be attached to the refrigerant line 19 using a tension device similar to the tension device 28.

In FIG. 7, reference numerals have been increased by 400 for parts corresponding to the valve shown in FIGS. 1 through 3. It will be seen that the valve 404 illustrated in FIG. 7 is inverted relative to the prior forms of the invention, for reasons which will become apparent immediately below.

In this form of the invention, similar to FIG. 4, the compensation channel 420 is internally within the valve 404, and otherwise the valve, except for its inversion, is essentially identical to that illustrated in FIG. 2.

In the form shown in FIG. 7, a separate sensor is eliminated. Instead, the heating element 427 is applied directly to the housing 406 of the valve 404 at the sensor chamber 418. An electrical line 29 leads to the regulator 30, as described above.

In this form of the invention, heat is supplied directly to the sensor chamber 18 by the heating element 427, without the need of a separate sensor and capillary tube, thus rendering the valve 404 simpler than those of the earlier forms of the invention. However, as will be apparent to one skilled in the art, the valve 404 must be inverted as illustrated in FIG. 7 for proper and efficient heating of the medium present in the sensor chamber 418.

Operation of the invention will now be described in further detail. In either the form of the invention with the separate sensor 23, 123 or 223, or the form of the invention in which the heating element 427 applies heat directly to the expansion valve 404, the valve opens when pressure in the sensor chamber 18 exceeds the sum of the pressure in the pressure chamber 17 and the force of the spring 14. In the form of the invention employing a sensor, most of the energy applied by the heating element 27, 127 or 327 will flow into the medium within the sensor, although a small portion will flow through the wall of the sensor around the medium. Heat from the heating element causes the fluid medium to boil, and evaporated refrigerant bubbles upwardly to the upper portion of the sensor where the temperature is lower. The refrigerant vapor condenses by delivering heat to the upper side of the sensor which abuts the outlet of the expansion valve. At the same time, pressure is increased within the sensor, that pressure being applied to the sensor chamber 18, opening the valve.

Similarly, in the form of the invention shown in FIG. 7, heat applied by the heating element 27 is applied directly to the medium located within the sensor chamber 418. Heat from the heating element causes the fluid medium in the sensor chamber 418 to boil, increasing pressure within the sensor chamber 418 and therefore opening the valve 404. At the same time, bubbles of refrigerant extend upwardly in the sensor chamber 418 to areas where the temperature is lower. Here the vapor condenses by delivering heat to the surrounding liquid, and the heat is then conducted through the actuator 412 to the pressure chamber 417. There therefore is a constant transfer of heat to the refrigerant flowing through the valve 404, in the same manner as the first forms of the invention, where there is constant transfer of heat from the sensor 23, 123 or 323 to the outlet tube 19 leading from the evaporator valve.

Figure 8:
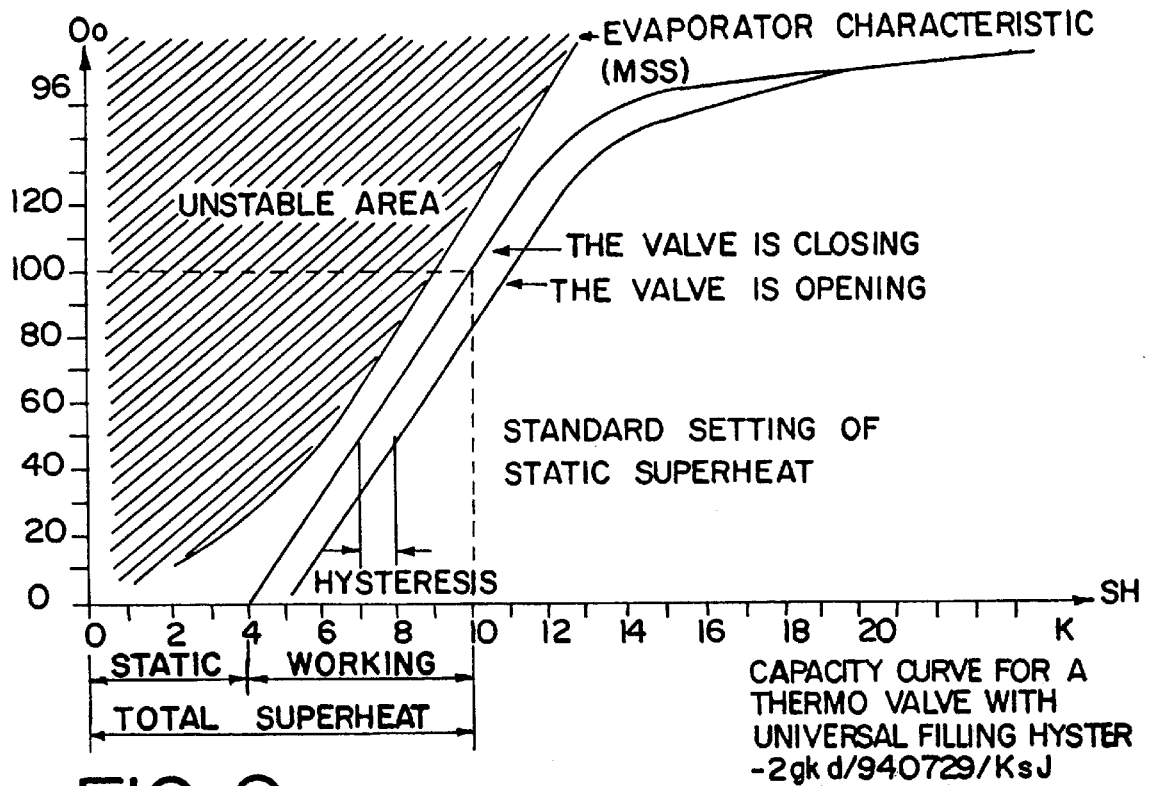
FIG. 8 is a curve showing typical characteristics for an valve expansion, when illustrated in relation to one type of evaporator.

Illustrated in FIG. 8 by the parallel curves are characteristics of a typical expansion valve where the vertical axis represents the cooling power and the horizontal axis represents the superheat temperature in degrees Kelvin. The superheat is a relative number which is determined by the formula $SH=T_f-T_s$ where $T_f$ and $T_s$ are, respectively, as described above.

In FIG. 8, it is seen that a certain "static" superheat is required to initiate valve opening. In this example, the static superheat is 4° K. In the example illustrated, the valve has a hystereis of one degree during normal operating characteristics.

Also shown in FIG. 8 is a curve of the typical minimum stable superheat of an evaporator. As is well known in relation to evaporators, certain evaporators require a superheat of a certain amount in order to be stable, or, in other words, to guarantee the absence of liquid refrigerant overflow into the compressor suction line, which may eventually damage the compressor. The MSS (Minimum Stable Superheat) curve of the evaporator is what is illustrated in FIG. 8, and it is required that the expansion valve 4, 104, 404 or other injection controller avoid the unstable area of operation of the evaporator. If not, the expansion valve or other injection device will start hunting because fluid suddenly flows from the outlet of the evaporator and influences the temperature sensor. In this instance, the control system will become unstable. In FIG. 8, the operational curves of the expansion valve are totally outside of the unstable area of the evaporator, and therefore the expansion valve can work stably in its full operating range. Furthermore, the operating curves of the expansion valve and the evaporator are quite close to one another, indicating that the evaporator and the expansion valve will work very efficiently together at an optimal energy level.

Figure 9:
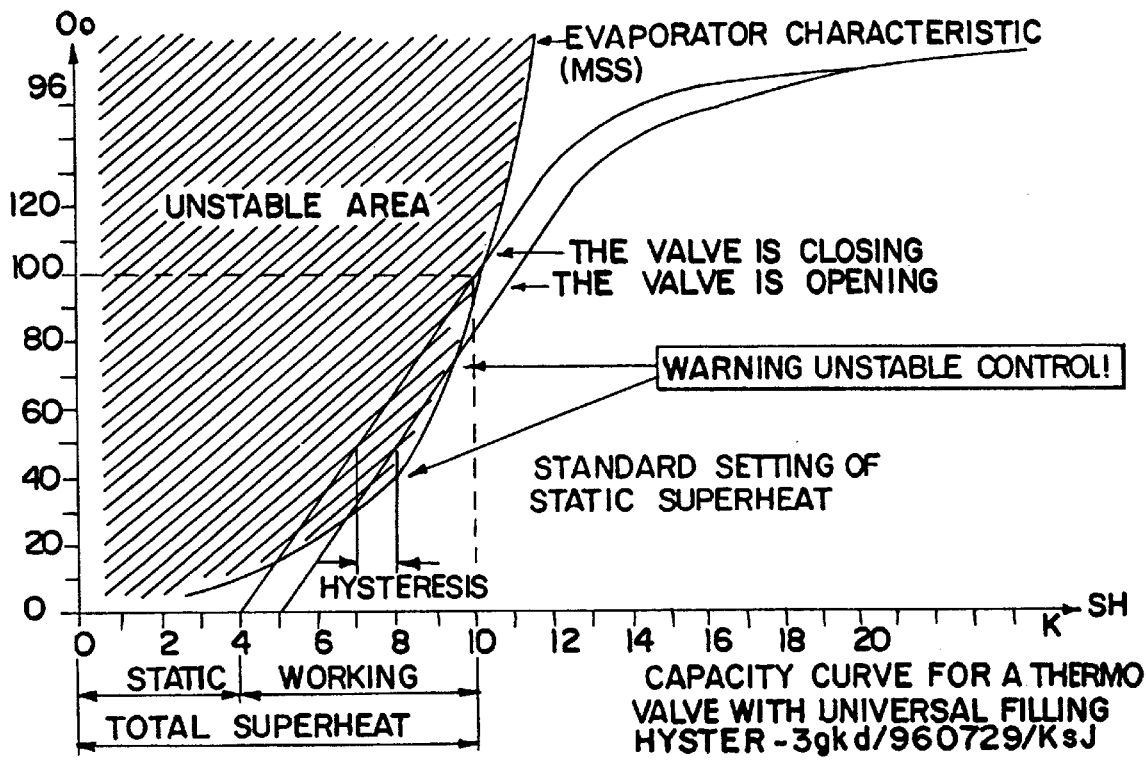
FIG. 9 is a drawing similar to FIG. 8, but for a different evaporator having characteristics in an unstable area which conflict with the valve characteristics.

FIG. 9 illustrates similar sets of curves showing the evaporator characteristics and those of an expansion valve, but where the evaporator has an unstable area overlapping the working area of the expansion valve. The expansion valve will therefore oscillate in its operation with the risk that liquid refrigerant can flow through the evaporator to the downstream compressor, and damage the compressor.

Figure 10:
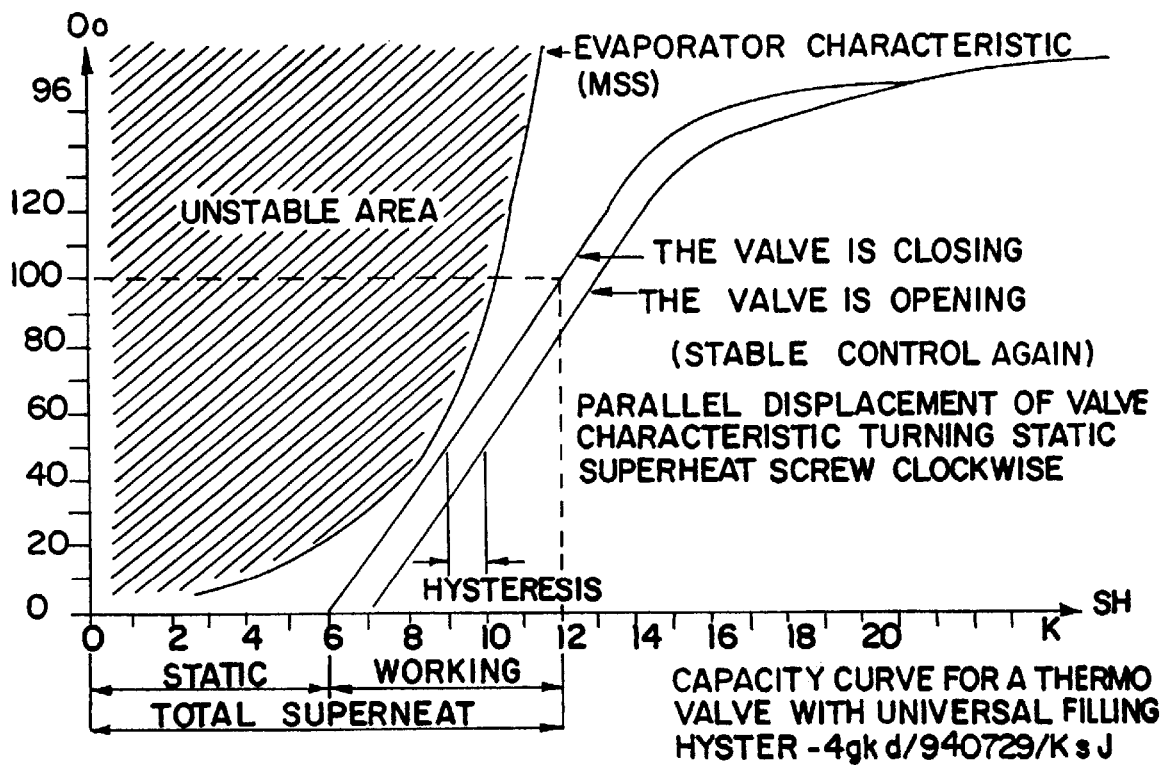
FIG. 10 is a view similar to FIG. 9, but with the valve operating characteristics having an increased static superheat to avoid the unstable area.

FIG. 10 illustrates a situation similar to that illustrated in FIG. 9, but with the static superheat of the expansion valve increased from 4° K to 6° K. Therefore, the expansion valve will be able to work stably within its entire operating range. However, as seen, the operating characteristics of the expansion valve and the evaporator are close to one another only in a very small range. Particularly at high capacity, where the effectiveness of the evaporator is most important, there is a large gap between the working characteristics of the valve and the evaporator. This means that the evaporator is not as efficiently filled with refrigerant fluid and therefore will not work at its optimum characteristics.

Figure 11:
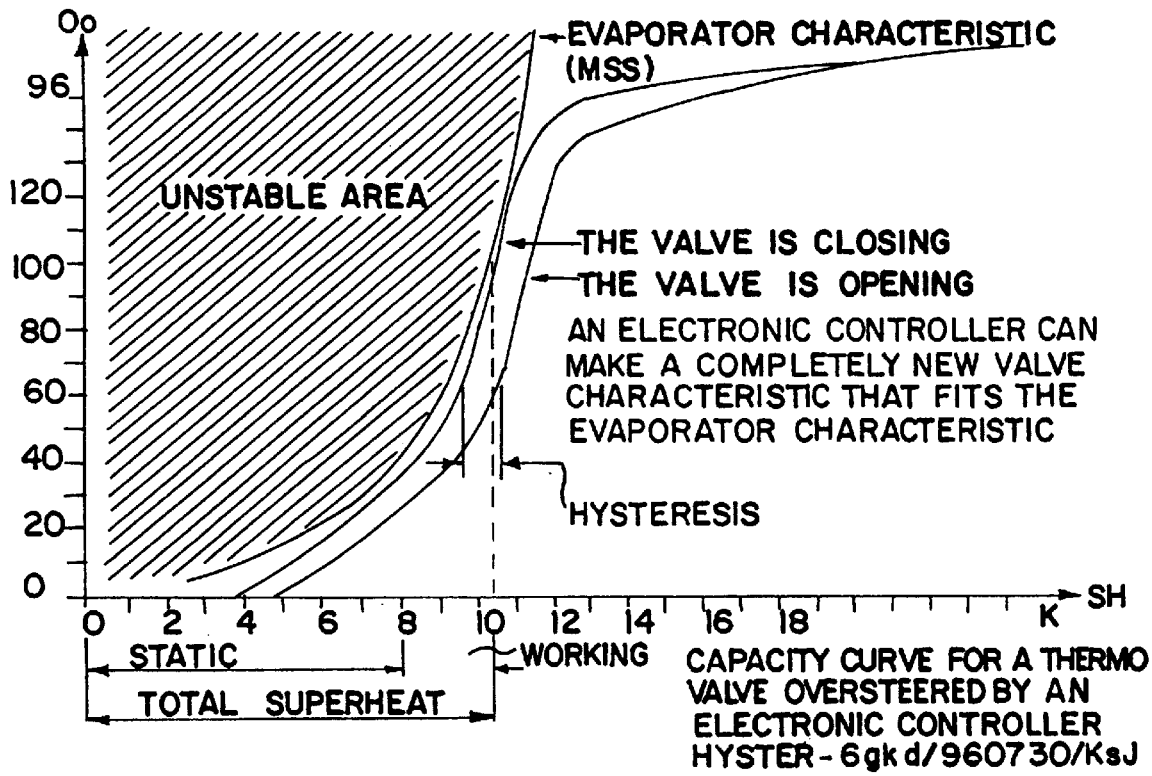
FIG. 11 is a view similar to FIG. 10, but showing the valve characteristics for a valve operated in accordance with the invention so as to have operating characteristics close to those of the evaporator.

FIG. 11 illustrates use of the invention to more closely match the operating characteristics of the evaporator and the expansion valve. By utilizing the heating element 27, 127, 327, 427, it is seen that the operating curves for the expansion valve will closely follow the operating curve for the evaporator throughout the entire operating range. Thus, employing the electronically-controlled regulator 30 of the invention in the manner described above allows optimal operation and permits operation of the valve characteristics to be arranged as desired to match the operating characteristics of the evaporator throughout all operating conditions.

Of course, refrigeration systems also can be operated in the manner described using several parallel connected evaporators. In this case, the sensor can be arranged selectively before the distributor, or in one of the branch lines after the distributor. The superheating can also be measured in another way as depicted in FIG. 1, for example by respective temperature sensors before and after the evaporator. The pipe-shaped compensation channel of FIG. 1 also can be combined with the sensor assigned to the housing according to FIG. 5, or the inner compensation channel according to FIG. 5 can be combined with the sensor fitting on the refrigerant line according to FIG. 1 or 6.

Figure 12:
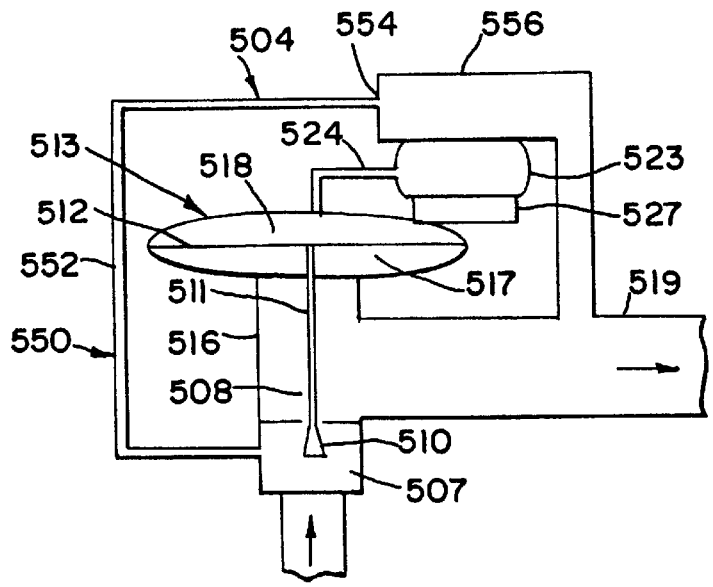
FIG. 12 is a schematic diagram of a modified expansion valve according to the invention, partially in cross section.

FIG. 12 depicts a further embodiment of the invention, where reference numerals have been increased by 500 and are used for parts corresponding to the earlier forms of the invention described above. In this form of the invention, a fluid circuit bypassing the expansion valve 504 is designated at 550. The fluid circuit 550 extends from the input chamber 507 to the refrigerant line 519 connected to the output chamber 508. The fluid circuit 550 includes a small tube 552 connected via a small orifice 554 to an expansion chamber 556 connected to the outlet refrigerant line 519. The sensor 523 is thermally connected to the expansion chamber 556, with the heating element 527 being located beneath the sensor 523. A capillary tube 524 connects the sensor 523 to the upper pressure chamber 518 of the diaphragm syphon 513. Obviously, in this form of the invention, a portion of the refrigerant bypasses the expansion valve 504 by means of the fluid circuit 550. However, the same operation as described in relation to the earlier forms of the invention results from the configuration shown in FIG. 12.

Figure 13:
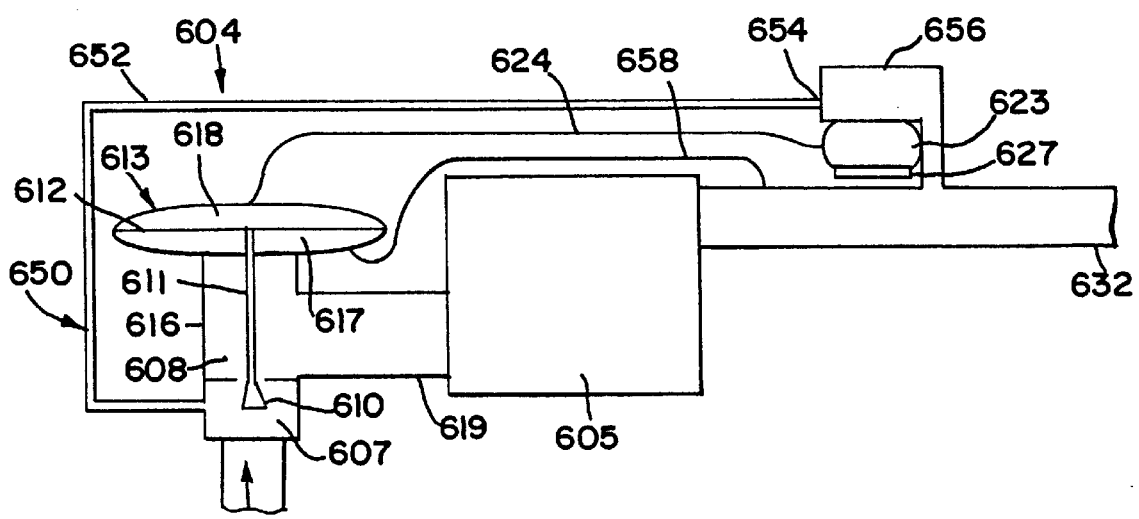
FIG. 13 is a schematic representation of yet another modified expansion valve according to the invention, partially in cross section.

FIG. 13 is yet another form of the invention, this time having reference numerals increased by 600 for corresponding parts. Similar to FIG. 12, this form of the invention includes a fluid circuit 650 extending from the input chamber 607 to the output line 632 from the evaporator 605. The fluid circuit 650 includes a tube 652 leading to a small orifice 654 leading to an expansion chamber 656. The sensor 623 and heating element 627 are located beneath the expansion chamber 656. Similar to the form of the invention illustrated in FIG. 12, a capillary tube 624 leads from the sensor 623 to the upper pressure chamber 618 of the diaphragm syphon 613. In addition, the lower pressure chamber 617 is connected via a tube 658 to the output line 632 of the evaporator 605 so as not to be influenced by any pressure drop across the evaporator 605.

Various changes can be made to the invention without departing from the spirit thereof or scope of the following claims.

What is claimed is:

1. An expansion valve comprising a closure member coupled to a displaceable wall separating a pressure chamber from a sensor chamber comprising at least part of a sensor system holding a charge for generating a temperature-dependent pressure, the closure member opening a passage between an inlet and an outlet of the expansion valve upon displacement of the wall into the pressure chamber, the valve further comprising a heater in thermal contact with the sensor system and a heat transfer path from the heated sensor system to a surface in fluid communication with liquid expanded refrigerant.

2. An expansion valve according to claim 1 in which said surface comprises a portion of an outlet of the expansion valve.

3. An expansion valve according to claim 1 in which said surface comprises at least a portion of said displaceable wall.

4. An expansion valve according to claim 1 in which said surface comprises a portion of a fluid circuit bypassing the expansion valve.

5. An expansion valve according to claim 1 in which said sensor system includes a sensor located at an outlet of the expansion valve, said heater being in thermal contact with said sensor.

6. An expansion valve according to claim 5 in which said heater is located beneath the sensor of said sensor system.

7. An expansion valve according to claim 1 in which said sensor chamber comprises said sensor system, and said heater is mounted on said sensor chamber.

* * * * *